(12) United States Patent
Bryan et al.

(10) Patent No.: US 9,474,992 B2
(45) Date of Patent: Oct. 25, 2016

(54) FLUID INTERCONNECT

(75) Inventors: Deborah M. Bryan, Cheshire, CT (US); Christina S. Park, Pearl River, NY (US); Laurence W. Bassett, Killingworth, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 993 days.

(21) Appl. No.: 13/126,686

(22) PCT Filed: Nov. 3, 2009

(86) PCT No.: PCT/US2009/063080
§ 371 (c)(1),
(2), (4) Date: Jun. 9, 2011

(87) PCT Pub. No.: WO2010/053903
PCT Pub. Date: May 14, 2010

(65) Prior Publication Data
US 2011/0297604 A1 Dec. 8, 2011

Related U.S. Application Data

(60) Provisional application No. 61/111,156, filed on Nov. 4, 2008.

(51) Int. Cl.
*B01D 35/30* (2006.01)
*B01D 29/41* (2006.01)

(52) U.S. Cl.
CPC ............ *B01D 29/41* (2013.01); *B01D 35/303* (2013.01); *B01D 2201/302* (2013.01); *B01D 2201/4007* (2013.01); *B01D 2201/4015* (2013.01)

(58) Field of Classification Search
CPC ...... B01D 25/26; B01D 29/19; B01D 29/39; B01D 46/10; B01D 25/002; B01D 25/02; B01D 27/08; B01D 27/146; B01D 27/148; B01D 29/13; B01D 29/31; B01D 29/33; B01D 29/395; B01D 2201/4007
USPC ....... 210/237, 238, 232, 252, 348, 457, 470; 403/314, 320, 350, 347.1, 409.1, 403/DIG. 8
See application file for complete search history.

(56) References Cited

U.S. PATENT DOCUMENTS 4,051,036 A     9/1977   Conrad et al.
4,052,307 A * 10/1977   Humbert, Jr. ................ 210/130
(Continued)

FOREIGN PATENT DOCUMENTS

DE     3741552     6/1989
EP     1398065     3/2004
(Continued)

OTHER PUBLICATIONS

International Search Report for PCT/US2009/063066, mailed Jun. 18, 2010.
(Continued)

*Primary Examiner* — Nam Nguyen
*Assistant Examiner* — Claire Norris
(74) *Attorney, Agent, or Firm* — Aleksander Medved; Scott A. Baum

(57) ABSTRACT

A fluid interconnect for a fluid handling device is disclosed. The fluid interconnect comprises a connector having a first axis. A sealing member is disposed on the connector. At least one camming member is also disposed on the connector. The at least one camming member is disposed inboard of the sealing member.

30 Claims, 12 Drawing Sheets

(56) References Cited

U.S. PATENT DOCUMENTS

| | | | | |
|---|---|---|---|---|
| 4,228,012 | A | * | 10/1980 | Pall .............................. 210/238 |
| 4,764,275 | A | | 8/1988 | Robichaud |
| 4,783,262 | A | | 11/1988 | Ostreicher et al. |
| 4,828,694 | A | | 5/1989 | Leason |
| 4,881,313 | A | | 11/1989 | Artinyan et al. |
| 5,049,274 | A | | 9/1991 | Leason et al. |
| 5,112,503 | A | * | 5/1992 | Raifman ...................... 210/777 |
| 5,435,915 | A | * | 7/1995 | Connors, Jr. ................. 210/232 |
| 5,490,930 | A | | 2/1996 | Krull |
| 5,762,671 | A | | 6/1998 | Farrow et al. |
| 5,851,267 | A | | 12/1998 | Schwartz |
| 5,906,740 | A | * | 5/1999 | Brown et al. ................. 210/450 |
| 6,120,685 | A | | 9/2000 | Carlson et al. |
| 6,165,303 | A | | 12/2000 | Darby et al. |
| 6,306,298 | B1 | | 10/2001 | Diemer |
| 6,458,269 | B1 | | 10/2002 | Bassett et al. |
| 6,712,966 | B1 | | 3/2004 | Pulek et al. |
| 6,716,348 | B1 | | 4/2004 | Morgan |
| 6,827,846 | B2 | | 12/2004 | Knight |
| 6,830,683 | B2 | | 12/2004 | Gundrum et al. |
| 6,939,466 | B2 | | 9/2005 | Pulek et al. |
| 6,949,189 | B2 | | 9/2005 | Bassett et al. |
| 7,122,120 | B2 | * | 10/2006 | Diel .............................. 210/232 |
| 7,147,772 | B2 | | 12/2006 | Fritze |
| 7,582,209 | B2 | | 9/2009 | Pulek et al. |
| 7,736,503 | B2 | | 6/2010 | Kennedy et al. |
| 7,905,935 | B2 | * | 3/2011 | Clements ..................... 55/341.1 |
| 2004/0020838 | A1 | | 2/2004 | Gabl |
| 2005/0279695 | A1 | * | 12/2005 | Straeffer et al. .............. 210/335 |
| 2006/0032806 | A1 | | 2/2006 | Parker |
| 2006/0065607 | A1 | | 3/2006 | Bassett et al. |
| 2008/0190839 | A1 | | 8/2008 | Girondi |
| 2009/0199523 | A1 | | 8/2009 | Hilberer |

FOREIGN PATENT DOCUMENTS

| | | |
|---|---|---|
| GB | 2218918 | 11/1989 |
| JP | 62-097617 | 5/1987 |
| JP | 2002-018209 | 1/2002 |
| JP | 2004-536703 | 12/2004 |
| JP | 2006026453 | 2/2006 |
| WO | WO 98/23356 | 6/1998 |
| WO | WO 01/83077 | 11/2001 |
| WO | WO-03/011441 | 2/2003 |
| WO | WO-2008/017474 | 2/2008 |
| WO | WO 2010/053898 | 5/2010 |

OTHER PUBLICATIONS

International Search Report for PCT/US2009/063080, mailed Jun. 14, 2010.

* cited by examiner

FLUID INTERCONNECT

CROSS REFERENCE TO RELATED APPLICATIONS

This application is a national stage filing under 35 U.S.C. 371 of PCT/US2009/063080, filed Nov. 3, 2009, which claims priority to U.S. Application No. 61/111,156, filed Nov. 4, 2008, the disclosure of which is incorporated by reference in its/their entirety herein.

BACKGROUND

Stacked, disk-type lenticular filters have been used in processing of fluids for commercial applications. In a typical filtration system employing such filters, the filters are assembled for operation inside a sanitary housing that is sealable from an ambient environment. Each disk-type filter comprises an outer ring and an inner core. The outer ring and inner core are connected by a web of filtration media of some type, and the filtration media is sealed to the outer ring and the inner core. The disk-type filter is typically designed to accommodate fluid flow from outside to in. In other words, fluid to be filtered typically flows into the sanitary housing, through the filtration media, and into the inner core. Typically, several such disk-type filters are stacked upon one another, forming a stacked inner core extending along the axis of each disk. The housing is typically a generally cylindrical pressure vessel that has structure for fluid ingress and egress.

In typical systems, it is important that each filter remain properly sealed to each adjacent filter during operation, so as to prevent bypass of fluid past the filtration media. To that end, the stack of filters is typically held together, or compressed, at least partly through the use of a center rod. The center rod is typically a continuous rod extending through the stacked inner core. The center rod can comprise or be accompanied by one or more means for providing compression to the stack of filters, including an "active follower." An active follower may employ a resilient spring to help "take up" any slack or looseness that may develop in the stack after the filtration media becomes wetted and more readily crushes. Proper compression of the stack can be a matter of "feel" and is often dependent upon the skill and training of the operator.

Under normal operation, pressurized fluid to be filtered enters the sanitary housing through the fluid ingress and fills the area surrounding the disk-type lenticular filters. The fluid is then filtered through the filter elements, after which the filtered fluid enters the stacked inner core. The stacked inner core is fluidly connected to a fluid egress, which can route the filtered fluid (filtrate) to downstream plumbing.

Such systems are often bulky and time consuming to assemble. Furthermore, such systems typically comprise several heavy and expensive metallic parts that must be cleaned and sanitized between uses. The sanitary housing must be carefully cleaned with each use. The sanitizing steps can add significant delay to processes. Often, significant quantities of sanitizing agent must be used to sanitize such parts. Consumption and disposal of such sanitizing agents can create undesirable environmental impact. Furthermore, such systems often require a skilled and trained operator for proper compression.

There is a continuing need for filtration systems that are lighter and are easier to assemble. There is also a need for filtration systems employing materials that, when disposed of, are less expensive and more environmentally friendly. There is also a need for filtration systems that require less cleaning and down-time between uses. There is also a need for filtration systems that are less reliant upon operator skill in achieving satisfactory results.

SUMMARY OF THE INVENTION

The present disclosure relates generally to filtration systems comprising disposable filter capsules. The present disclosure further relates to a fluid interconnect that may be employed in connecting filter capsules to one another. Such systems can eliminate the need for a separate sanitary housing. Such systems can reduce or eliminate the need for sanitization between uses. Such filtration systems can have a shorter overall stack height than known filtration systems. The shorter stack height can also provide a reduction in fluid hold-up volume from previously known systems. The fluid interconnect of the present disclosure can reduce the number of parts and amount of labor required to fabricate a fluid interconnect. The fluid interconnect of the present disclosure can ensure proper sealing of an inner core portion when employing filter capsules housing large diameter disk-type filters. The presently described fluid interconnect can also allow for easier connection between large diameter filter capsules by putting connector on the smaller inner portion, thus providing mechanical advantage and reducing the mechanical work required to connect the filter capsules to one another. Location of the fluid interconnect on a smaller diameter portion of a large diameter filter capsule can also work to decrease flexure of filter capsules during installation and operation. In embodiments where non-lubricated seals are employed between filter capsules, the fluid interconnect of the present disclosure can make connection of filter capsules easier by applying insertion force local to and evenly across the seal. The fluid interconnect according to the present disclosure can also significantly reduce the cost of tooling associated with forming interconnect geometry on a smaller diameter of a large-diameter filter capsule.

The present application discloses a fluid interconnect for a fluid handling device. The fluid interconnect comprises a connector having a first axis. A sealing member may be disposed on the connector. At least one camming member may also be disposed on the connector. In some embodiments, the at least one camming member is disposed inboard of the sealing member.

In one embodiment, the connector further comprises an inner connector wall and an outer connector wall. In such embodiments, the outer connector wall is disposed outboard of the inner connector wall and faces radially outward. In such embodiments, the sealing member may be located on the outer connector wall and the at least one camming member may be located on the inner connector wall.

In one embodiment, the sealing member and the at least one camming member are at least partially intersected by a common plane that is oriented normal to the first axis.

In one embodiment, the at least one sealing member may be disposed on a sealing ring member and the at least one camming member may be disposed on a camming ring member. In such embodiments, the sealing ring member may be secured to the camming ring member to form the fluid interconnect.

In one embodiment, the fluid connector comprises at least three camming members spaced about the inner connector wall. In some embodiments embodiment, the sealing member comprises a non-lubricated o-ring.

In one embodiment, the fluid handling device comprises a filter capsule configured to contain at least one filter element. In another embodiment, the fluid handling device comprises a filter cartridge.

In one embodiment, the sealing member seals against a vertical sealing surface.

The present application also discloses a filter capsule. The filter capsule may comprise a shell having a first end wall, a first axis, and an outer capsule wall spaced a first distance from the first axis. The first end wall may comprise a fluid interconnect. The fluid interconnect may comprise a connector ring spaced a second distance from the first axis, a sealing member disposed on the connector ring, and at least one camming member disposed on the connector ring. In some embodiments, the first distance may be at least four times larger than the second distance.

In one embodiment of the filter capsule, the sealing member and the at least one camming member are at least partially intersected by a common plane that is oriented normal to the first axis.

In some embodiments of the filter capsule, the at least one sealing member may be disposed on a sealing ring member and the at least one camming member may be disposed on a camming ring member. In such embodiments, the sealing ring member may be secured to the camming ring member to form the connector ring.

In some embodiments, the filter capsule comprises at least three camming members spaced about the connector ring. In one embodiment of the filter capsule, the sealing member comprises a non-lubricated o-ring.

In some embodiments of the filter capsule, the at least one camming member is disposed inboard of the sealing member.

In some embodiments of the filter capsule, the connector ring comprises an inner ring wall and an outer ring wall. In such embodiments, the outer ring wall is disposed outboard of the inner ring wall and faces radially outward. In some embodiments, the sealing member is located on the outer ring wall and the at least one camming member is located on the inner ring wall.

In some embodiments, the shell comprises a second end wall opposite the first end wall. In one embodiment, the second end wall comprises a mating interconnect that is connectable with the fluid interconnect.

The present application also discloses a filtration system. In some embodiments, the filtration system comprises at least a first filter capsule and a second filter capsule. Typically, at least one filter element is disposed within each filter capsule. Typically, the fluid interconnect connects the first filter capsule to the second filter capsule.

In some embodiments, each filter capsule comprises a first end wall and a second end wall opposite the first end wall. In such embodiments, the first end wall may comprise the fluid interconnect and the second end wall may comprise a mating interconnect. In such embodiments, each fluid interconnect connects to each adjacent mating interconnect.

In some embodiments, the first filter capsule may include a different type of filter element than the second filter capsule.

In some embodiments, the filtration system comprises a press that holds the filter capsules together during operation of the filtration system. In some such embodiments, each filter capsule comprises a first end wall, a second end wall, and an outer capsule wall, wherein the fluid interconnect connects the first end wall of the first filter capsule to the second end wall of the second filter capsule. In such embodiments, the press bears in the axial direction against the outer capsule wall of each filter capsule to hold the filter capsules together.

In some embodiments, the filtration system comprises a manifold member, wherein the fluid interconnect connects the manifold member to a filter capsule.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION OF THE DRAWINGS

Figure 1:
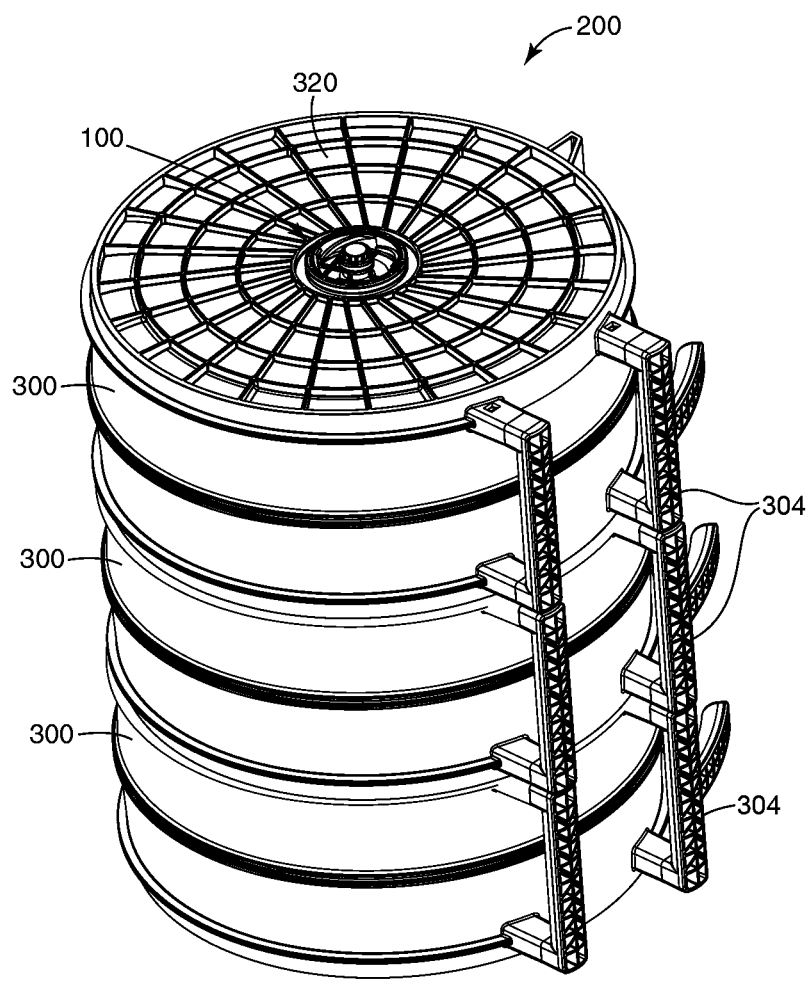
FIG. 1 is a perspective view of a filtration system depicting three filter capsules connected to one another.

FIG. 1 depicts one embodiment of a filtration system 200 according to the present disclosure. Filtration systems 200 according to the present disclosure may be used in conjunction with filtration systems and filter elements disclosed in related U.S. Pat. App. No. 61/111,185, filed Nov. 4, 2008, to Marks et al., entitled "Filter Element and Seal Therefor,". The filtration system 200 depicted in FIG. 1 comprises three filter capsules 300 connected to one another by a fluid interconnect 100. It is envisioned that more or less than three filter capsules 300 may be connected to one another to form the filtration system 200. In the embodiment shown in FIG. 1, the filter capsules 300 comprise a handle 304. The handle 304 can assist in assembly and disassembly of the filter capsules 300 from the filtration system 200. Each filter capsule 300 can comprise one or more filter elements 220 disposed therein. In some embodiments, each filter capsule 300 comprises a different type of filter element 220. For example, each filter capsule 300 may comprise a filter element 220 for one of, for example, depth filtration, scale reduction, antimicrobial treatment, antiviral treatment, flavor enhancement, or others. Such filter elements 220 may be used alone or in combination with other filter elements 220. In this way, the filtration system 200 may be customized to provide application-specific filtration.

Figure 10:
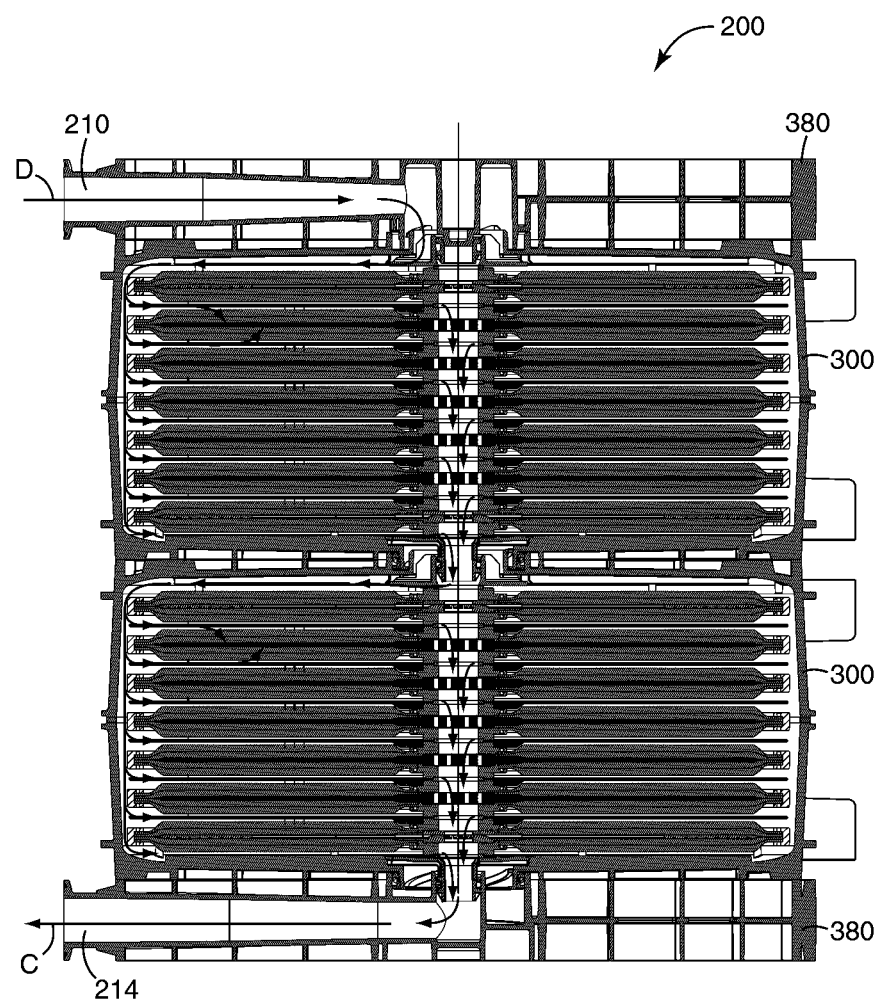
FIG. 10 is a cross section view taken at 3-3 of FIG. 2 showing a filter capsule containing a plurality of filter elements therein and having a manifold member connected on either end.

In some applications, it may be desirable to provide a filtration system 200 having either (i) both a feed fluid ingress 210 and a filtrate egress 214 located on a single end of the filtration system 200, or (ii) a feed fluid ingress 210 on one end and a filtrate egress 214 on the opposing end. Locating a feed fluid ingress 210 and a filtrate egress 214 located on a single end allows associated plumbing to be located in a single area, rather than being separated by the length of the filtration system 200. The result can be a more compact assembly. In some embodiments, the filtration system 200 may comprise one or more manifold members 380, as depicted in FIG. 10. As shown in FIG. 10, "D" depicts a flow of dirty, or unfiltered, fluid into the feed fluid ingress 210, and "C" depicts a flow of clean, or filtered, fluid from the filtrate egress 214. The purpose of the manifold member 380, when employed, is to direct fluid flow at a terminal end of the filtration system 200. The manifold member 380 can operate as a dead-end for filtrate, allowing the filtrate to reverse direction and travel back toward the filtrate egress 214 to exit the filtration system 200. The manifold member 380 may also provide both fluid ingress 210 and filtrate egress 214 on a single end of the filtration system 200. The manifold member 380 may, more simply, provide only feed fluid ingress 210 or only filtrate egress 214. Combinations of these embodiments are also envisioned. The manifold member 380 may be constructed of, for example, polycarbonate or polypropylene.

Figure 1A:
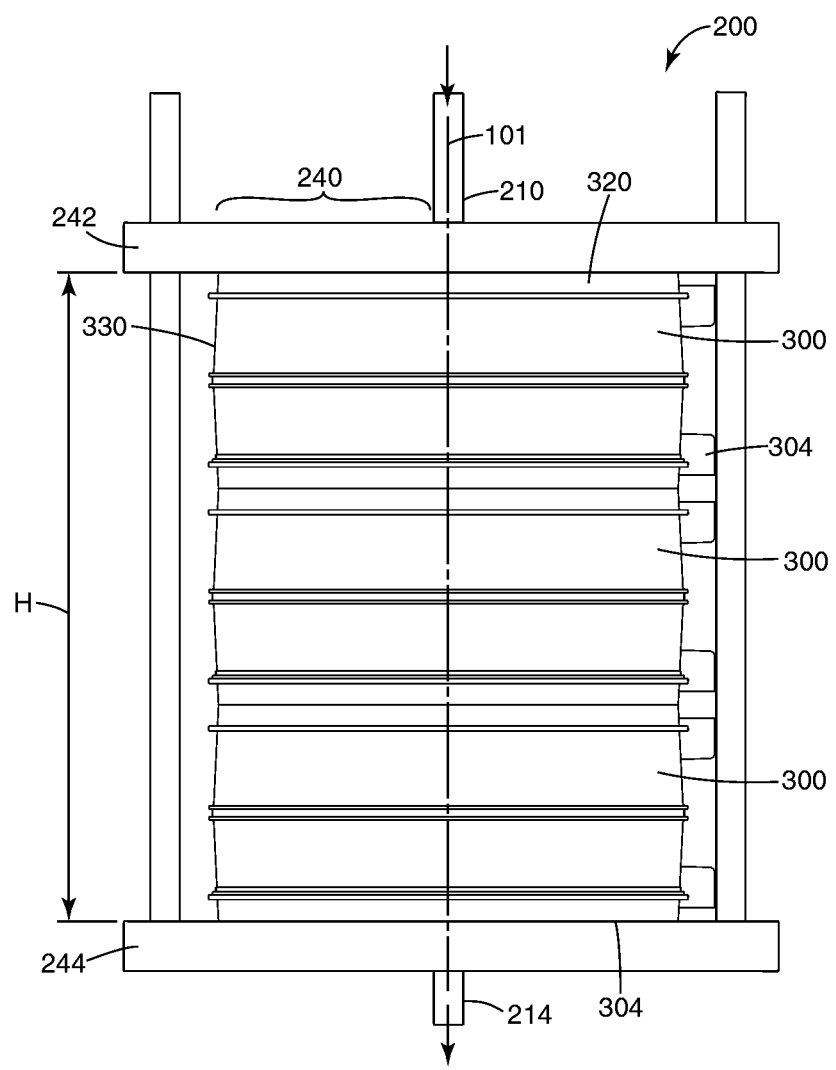
FIG. 1A is a side view of a filtration system comprising three filter capsules connected to one another and held in compression by a press.

In some embodiments, the filtration system 200 may be positioned in a press 240 during operation, as shown in FIG. 1A. A press 240 may be required, for example, to hold first and second end walls 320 and 340 of the outer-most located filter capsules 300 in a stack. Because such outer-most located end walls 320 and 340 are not supported against an adjacent filter capsule 300, contact with a press 240 can help to prevent wall flexure under internal fluid pressure. In such a press 240, two or more filter capsules 300 may be disposed between a first end plate 242 and a second end plate 244. The press 240 can apply force, along the direction of a first axis 101 of each filter capsule 300, to the first and second end plates 242, 244. Typically, the first and second end plates 242, 244 bear against an outer capsule wall 330 of the filter capsules 300. Typically, the outer capsule wall 330 of each filter capsule 300 contacts the outer capsule wall 330 of each adjacent filter capsule 300 at a bearing point 308, thus providing a known, rigid datum upon which to apply force. In some embodiments, the press 240 may further provide apparatus for feed fluid ingress 210 and filtrate egress 214. In some embodiments, parts of the press 240 may be constructed of, for example, stainless steel.

Figure 2:
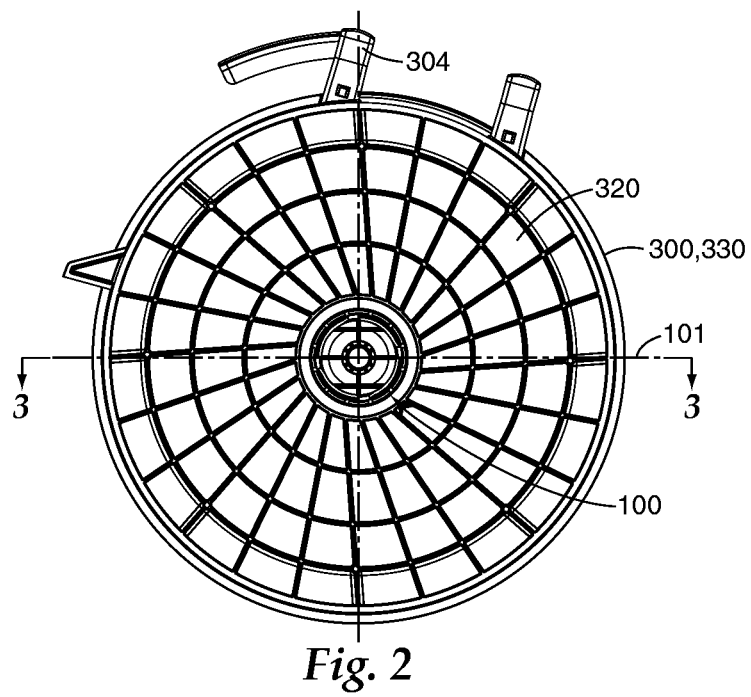
FIG. 2 is a top view of a filter capsule.
Figure 2A:
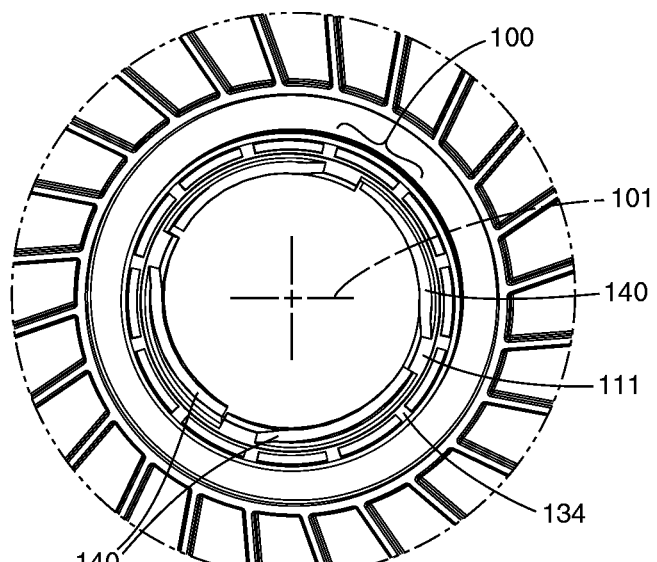
FIG. 2A is a detailed top view of a fluid interconnect located on a filter capsule.

FIGS. 2 and 2A depict a fluid interconnect 100 according to the present disclosure. In the embodiment depicted in FIG. 2, the fluid interconnect 100 is located on a first end wall 320 of a filter capsule 300. Typically, the fluid interconnect 100 comprises a first axis 101. The first axis 101 is located along a longitudinal axis of the fluid interconnect 100. In some embodiments, the fluid interconnect 100 is generally cylindrical in shape, and the first axis 101 corresponds with the axis of the cylindrical shape. In one embodiment, the fluid interconnect 100 is constructed of polycarbonate. The fluid interconnect 100 could also be constructed of, for example, polypropylene.

The fluid interconnect 100 typically engages a mating interconnect 350 through a method comprising the steps of (i) providing a fluid interconnect 100, (ii) providing a mating interconnect 350 opposite the fluid interconnect 100, wherein the first axis 101 is generally aligned with the axis of the mating interconnect 350, (iii) moving the fluid interconnect 100 and the mating interconnect 350 toward one another to engage the at least one camming member 140 with mating camming features on the mating interconnect 350, (iv) rotating the fluid interconnect 100 with respect to the mating interconnect 350, thereby advancing the at least one camming member 140 along each mating camming feature and drawing the fluid interconnect 100 into the mating interconnect 350. One embodiment of a mating interconnect 350 is shown in FIG. 3A.

Figure 4:
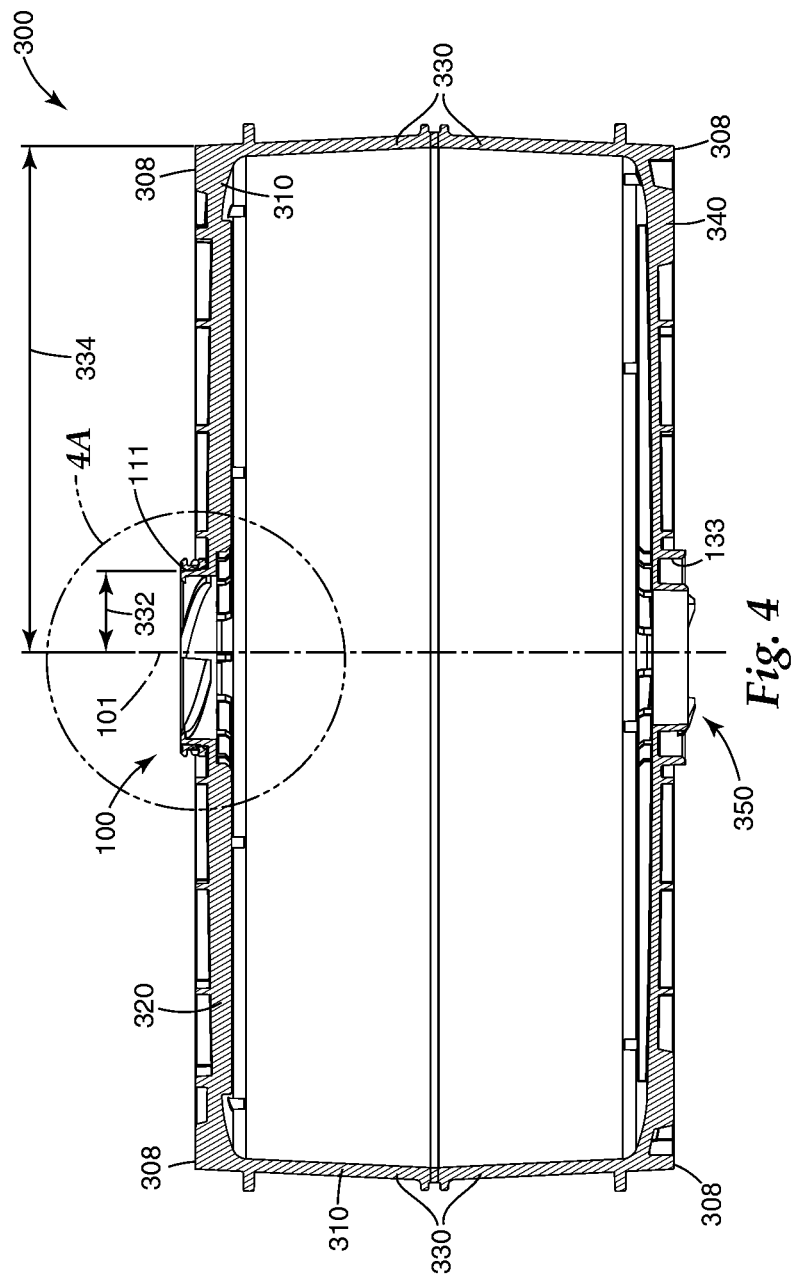
FIG. 4 is a cross-section view taken at 3-3 of FIG. 2 showing an empty filter capsule.
Figure 4A:
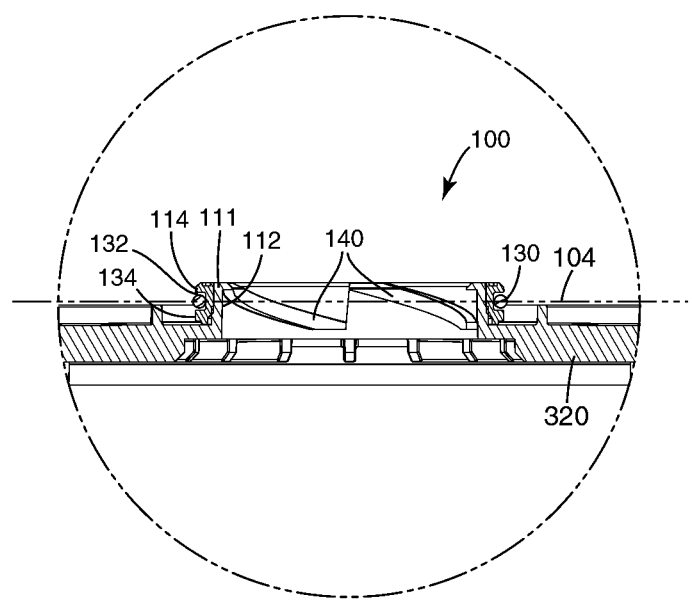
FIG. 4A is a detailed cross-section view taken at 3-3 of FIG. 2 showing a fluid interconnect comprising a sealing ring member secured to a camming ring member.
Figure 4B:
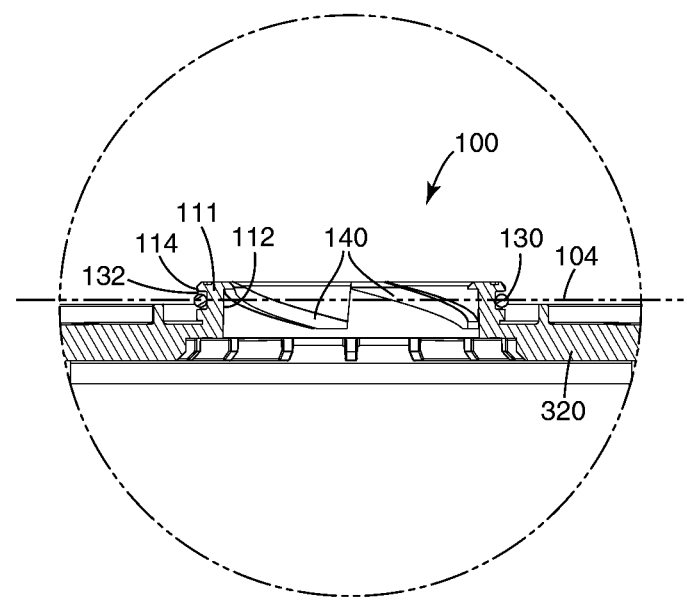
FIG. 4B is a detailed cross-section view taken at 3-3 of FIG. 2 showing a fluid interconnect wherein an o-ring groove is integrally provided.

The fluid interconnect 100 further comprises a sealing member 130 as depicted, for example, in FIGS. 4, 4A, and 4B. The sealing member 130 may be disposed on the fluid interconnect 100. The sealing member 130 may comprise, for example, an o-ring, a non-lubricated o-ring, a gasket, or an overmolded elastomeric seal. In some embodiments, the sealing member 130 comprises a non-lubricated o-ring. Non-lubricated o-rings may be employed to minimize the possibility of contaminants entering the fluid stream through lubricants used on the o-ring. Because non-lubricated o-rings create more friction during installation, greater than usual force may be required to connect a fluid interconnect 100 using non-lubricated o-rings.

Figure 6:
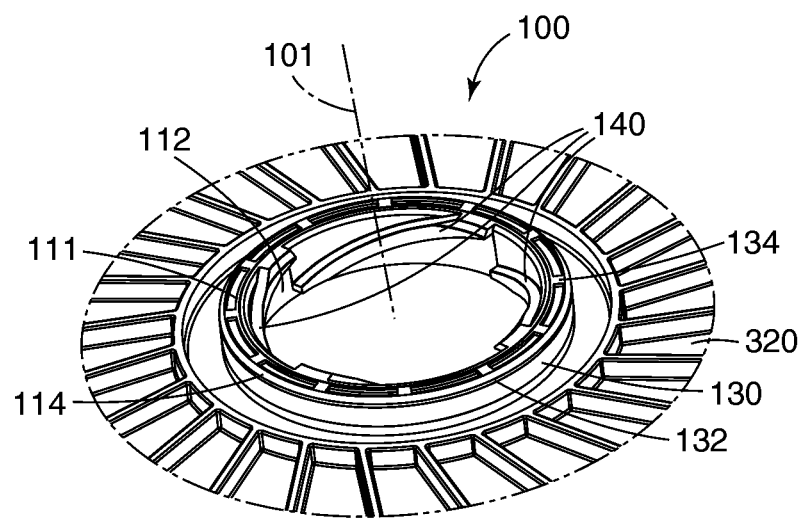
FIG. 6 is a detailed perspective view of a fluid interconnect.
Figure 7:
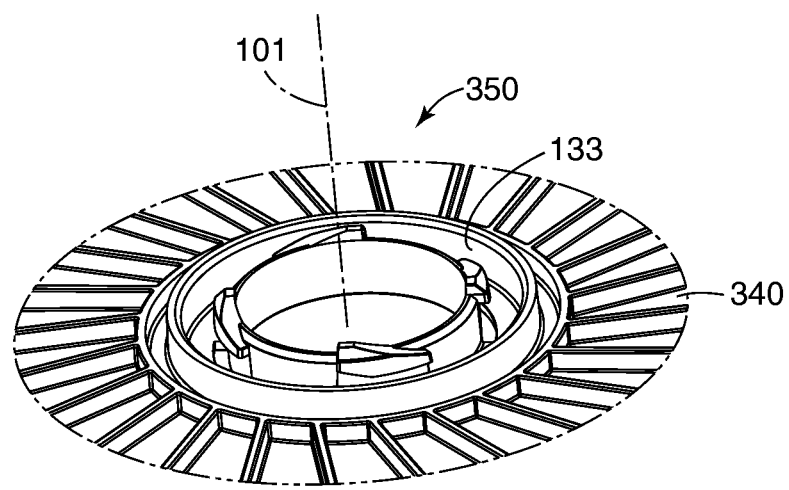
FIG. 7 is a detailed perspective view of a mating interconnect.

In some embodiments, the sealing member 130 is located on a vertical sealing surface 132 as shown, for example, in FIG. 6. When a vertical sealing surface 132 is used, the sealing member 130 slides along an opposing sealing surface 133 in a direction parallel to the first axis 101 during connection of the fluid interconnect 100. Consequentially, any slight axial movement of the sealing member 130 with respect to the opposing sealing surface 133 during operation of the filtration system 200 does not result in disruption of the seal. Therefore, forceful axial compression of the fluid interconnect 100 is not necessary. In contrast, when a face-seal configuration is employed, i.e. wherein a seal is created by axial force on a sealing member against a surface perpendicular to the first axis 101, care must be taken to avoid any axial movement. In such a face-seal configuration, any such axial movement would tend to disrupt or break the seal, allowing fluid bypass. In such face-seal configurations, forceful axial compression of the fluid interconnect 100 may be required. While it is envisioned that a face-seal could be employed within the scope of the present disclosure, a sealing member 130 located on a vertical sealing surface 132 is preferred because it can result in a more forgiving connection.

The fluid interconnect 100 further comprises at least one camming member 140. Typically, the at least one camming member 140 is located a short radial distance from the sealing member 130. Locating the at least one camming member 140 radially close to the sealing member 130 allows for the work input to turning the fluid interconnect 100 to be most efficiently converted to overcoming the added friction of the non-lubricated o-ring. The at least one camming member 140 is typically constructed form the same material as the fluid interconnect 100. In some embodiments, the at least one camming member 140 is integrally molded as a part of the fluid interconnect 100.

Figure 5:
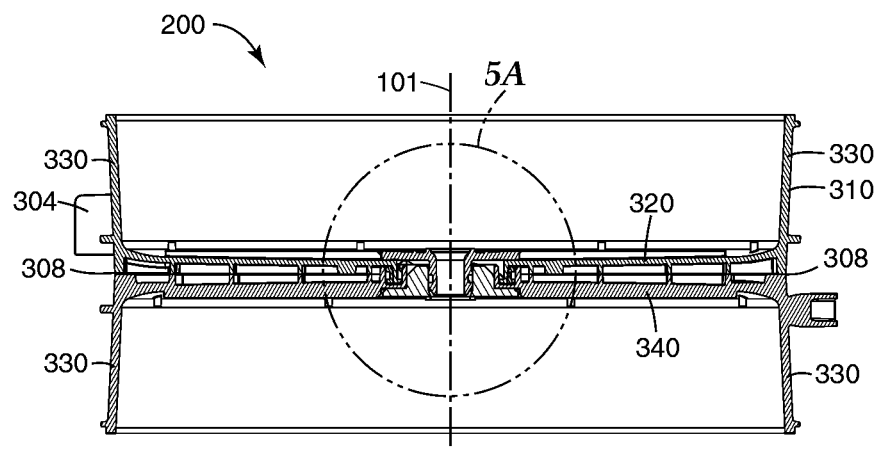
FIG. 5 is a cross-section view taken at 3-3 of FIG. 2 showing two filter capsule halves connected to one another by a fluid interconnect.
Figure 5A:
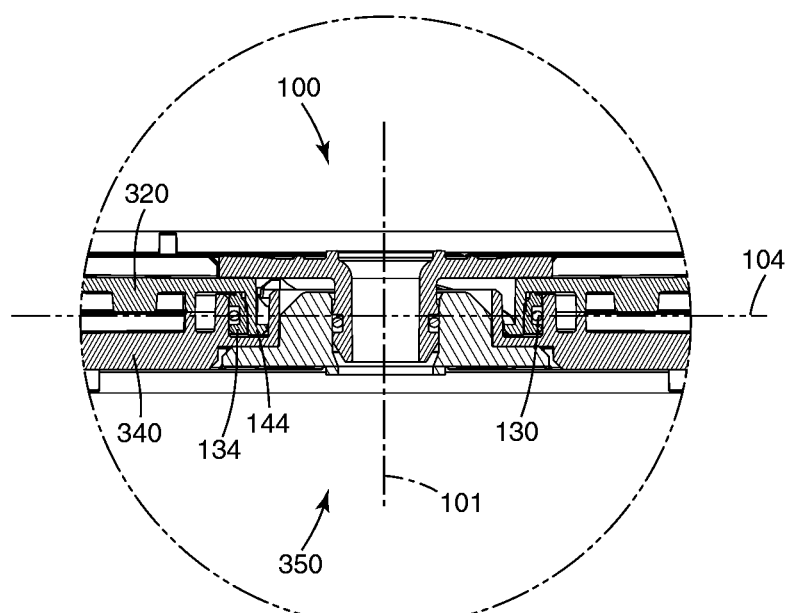
FIG. 5A is a detailed cross-section view taken at 3-3 of FIG. 2 showing two filter capsule halves connected to one another by a fluid interconnect.

Such location can achieve the further advantage of providing a positive engagement of the fluid interconnect 100 close to the fluid seal, thus ensuring that the fluid seal is not broken due to material flexure. Concern of such material flexure is especially present where a fluid interconnect 100 is employed on a filter capsule 300 housing large-diameter disk-type filter elements 220, as shown, for example, in FIG. 3. For example, a typical lenticular disk-type filter element 220 may measure about 17.5 inches in diameter, while the center core fluid egress may only measure about 3 inches in diameter. Because the filter elements 220 are a large diameter, the filter capsule 300 must be of a correspondingly large diameter. As previously discussed, an outer capsule wall 330 of the filter capsule 300 is typically used as a bearing surface for a press 240 in such filtration systems 200. Typically, two filter capsules 300, when connected, mate at a bearing point 308, as shown, for example, in FIG. 5. Accordingly, when the large diameter outer capsule wall 330 is "pinned" in place at the bearing point 308 by the press 240, and when the filtration system 200 is pressurized in operation, the smaller diameter center core area of the filter capsule 300 can flex or be displaced. Should this flexure or displacement be of sufficient magnitude, a seal between filter capsules 300 can be broken. The fluid interconnect 100 according to the present disclosure substantially prevents such flexure and displacement by providing a positive capsule-to capsule engagement at or near the center core.

In some embodiments, the at least one camming member 140 is disposed inboard of the sealing member 130, as shown, for example, in FIGS. 4A and 4B. By "inboard," Applicants mean a location that is more radially inward, as measured from the first axis 101 of the fluid interconnect 100. Inboard location includes embodiments wherein the at least one camming member 140 and the sealing member 130 are axially spaced from one another; i.e., wherein they are not intersected by a common plane 104. Locating the at least one camming feature inboard of the sealing member 130 generally means that the at least one camming member 140 will be in contact with a working fluid during operation of the fluid handling system. One advantage of such inboard positioning of the at least one camming feature is that it enables the fluid interconnect 100 to be fabricated more easily and with lower tooling cost, as discussed below. Especially in embodiments where a filter capsule 300 of relatively large diameter is used, the relatively smaller diameter of the fluid interconnect, coupled with locating the at least one camming member 140 inboard of the sealing member 130 can provide a tremendous torque advantage in rotating the larger-diameter filter capsule 300 to connect the fluid interconnect 100.

In embodiments where the at least one camming member 140 is disposed inboard of the sealing member 130, the fluid interconnect 100 results in a more structurally robust connection that is created at with decreased tooling cost as compared to alternative designs. For example, protruding plastic members in injection molded parts, such as the at least one camming member 140, are typically produced such that they do not create an "undercut." Forming an undercut in tooling creates a challenge because the tool maker must install slides or lifters that complicate the tool actions and increase the cost of the tool. There are also limitations as to the length of the protrusion due to such considerations as linear travel of the sliding tool steel and loss of cooling water local to the sliding tool steel.

Another less desirable solution is to mold a small separate plastic component with the at least one camming member 140 formed thereon and join it together inboard with a larger base part comprising a sealing member 130. Doing so increases tooling cost and labor to assemble the parts and also adds a failure modality, as explained below. The forces required to pull filter capsules 300 together create a reactive force on the at least one camming member 140. In other words, the bulk of the force holding filter capsules 300 together is carried by the at least one camming member. If the at least one camming member 140 were formed on a separately joined part, the reactive force on the at least one camming member 140 would tend to "pull" the separately joined part apart from the base part. Such reliance on a relatively weak joint risks failure of the fluid interconnect 100.

A better and lower-cost approach, as employed by Applicants, was to design plastic parts incorporating through-hole "shut offs" to create the inboard at least one camming member 140. Formation of a through-hole shut-off creates a window or aperture in the plastic wall below the formed undercut or protrusion in the at least one camming member 140. This would be problematic were the at least one camming member 140 not formed inboard of the sealing member because the aperture would create a fluid bypass.

Thus, Applicants' advantageous placement of the at least one camming member 140 "inboard" of the sealing member 130 (i) decreases tooling expense and complication by allowing the cam feature to be molded in the direction of the tool steel pull, (ii) eliminates structural compromise by removing the need for the at least one camming member to be a small part that is separately joined inboard, and (iii) prevents fluid bypass through apertures created by through-hole shut offs.

In one embodiment, the fluid interconnect 100 further comprises an inner connector wall 112 and an outer connector wall 114, as shown in FIGS. 4A and 4B. In such embodiments, the outer connector wall 114 is disposed outboard of the inner connector wall 112 and faces radially outward. By "outboard," Applicants mean a location that is more radially outward, as measured from the first axis 101 of the fluid interconnect 100. In some embodiments, the fluid interconnect 100 comprises a cylinder, wherein the inner connector wall 112 comprises the inner diameter of the cylinder and the outer connector wall 114 comprises the outer diameter of the cylinder. In such embodiments, the sealing member 130 may be located on the outer connector wall 114 and the at least one camming member 140 may be located on the inner connector wall 112. In other words, the at least one camming member 140 may be disposed inboard of the sealing member 130. Typically, the outer connector wall 114 comprises an o-ring groove into which an o-ring may be installed. In some embodiments, the o-ring may be non-lubricated.

In some embodiments, the sealing member 130 and the at least one camming member 140 are at least partially intersected by a common plane 104 that is oriented normal to the first axis 101, as shown in FIGS. 4A and 4B. In many known fluid interconnects, an o-ring is located above or below a camming feature. See, for example, FIG. 13 of U.S. Pat. No.

6,458,269, wherein two sealing o-rings are disposed on a neck portion of a filter apparatus above the position of a lug feature. Such feature placement can function satisfactorily, but construction of such filters consumes more plastic than would otherwise be necessary and creates a filter apparatus and overall assembly that is taller than would otherwise be necessary. By locating both the sealing member 130 and the at least one camming member 140 to intersect a common plane 104, it is possible to substantially reduce the height of the fluid interconnect 100. The height of a filter capsule 300 comprising the fluid interconnect 100 is likewise reduced. Similarly, the stack height "H" (shown, for example, in FIG. 1A) of a filtration system 200 comprising two or more connected filter capsules 300 is reduced. Partly as a result of the height reduction, the fluid interconnect 100 can be fabricated with less plastic than other connectors.

Reduced height of the fluid interconnect 100 can result in the further advantage of allowing for lower hold-up volume in the filtration system 200. By "hold-up volume," Applicants mean the volume of unused fluid that may remain in the filtration system 200 after processing or filtration. The greater the hold-up volume, the lower the throughput of the filtration system 200 because the unused fluid trapped in the filtration system 200 is not used for downstream processes. Some fluids used, for example, in the healthcare, bioprocessing, and pharmaceutical industries may be very costly on a per-liter basis. Even a slight reduction in hold-up volume can result in significant cost-savings for the user of the filtration system 200. By reducing the height of the fluid interconnect 100, the volume of fluid contained within the fluid interconnect 100 itself can be reduced proportional to the reduction in height.

In one embodiment, the sealing member 130 may be disposed on a sealing ring member 134 and the at least one camming member 140 may be disposed on the connector ring 111, as shown, for example, in FIG. 4A. Such an embodiments is in contrast, for example, to an embodiment as shown in FIG. 4B, wherein an o-ring groove is integrally formed into the fluid interconnect 100. A sealing ring member 134 provided separately, as in FIG. 4A, can ease the fabrication of the fluid interconnect 100 by, for example, eliminating the need for expensive slides or undercuts in mold tooling to form the o-ring groove present in some embodiments. While it is possible to machine such an o-ring groove, such an operation is expensive. Applicants solved this problem by fabricating a sealing ring member 134 separately with, in one embodiment, an o-ring groove already formed therein. In such embodiments, the sealing ring member 134 may be secured to the connector ring 111 to form the fluid interconnect 100. In such embodiments, the connector ring 111 can comprise the remaining geometry of the fluid interconnect 100. Typically, the sealing ring member 134 is secured by spin-welding it to the connector ring 111, though it is also possible to secure the sealing ring member 134 to the connector ring 111 by heat welding, ultrasonic welding, threading, adhesives, and other known joining methods. In one embodiment, the sealing ring member 134 is constructed from polycarbonate. The sealing ring member 134 may also be formed from, for example, polypropylene.

In one embodiment, the fluid interconnect 100 comprises at least three camming members 140 spaced about the inner connector wall 112. For example, four camming members 140 are shown in FIGS. 2A and 6. In embodiments where the sealing member 130 is a non-lubricated o-ring, the force required to connect the fluid interconnect 100 to the mating interconnect 350 may be higher than it would be if lubrication were used. In such embodiments, it can be beneficial to more evenly distribute the force applied to overcoming the friction of the non-lubricated o-ring. More even distribution of the friction force can help to prevent cross-threading or material flexure that could otherwise result from using only one or two camming members 140. Such even distribution may be accomplished by increasing the number of camming members 140 to more than two spaced about the fluid interconnect 100. The more camming members 140 present, within practical limits and size constraints, the more even the distribution of frictional force about the fluid interconnect 100. For example, the number of camming members 140 may be in a range from 3 to 6. In one embodiment, four camming members 140 are provided spaced about the fluid interconnect 100. It is also possible to provide only one or two camming members 140, for example, as a helical thread. In one embodiment, the camming members 140 are evenly spaced about the fluid interconnect 100.

Figure 8:
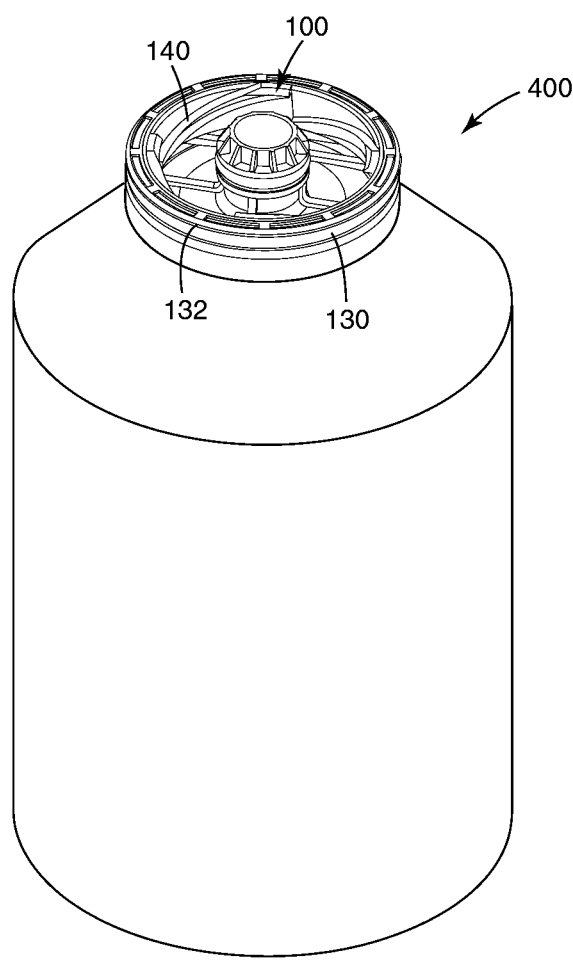
FIG. 8 is a perspective view of a filter cartridge comprising a fluid interconnect.

In another embodiment, the fluid handling device comprises a filter cartridge 400, as depicted in FIG. 8. A filter cartridge 400 may be used, for example, as part of a water filtration system 200 in a residential refrigerator or in an under-the-counter filtration system 200. The filter cartridge 400 could also be used, for example, as part of a fluid filtration system 200 in food service applications. As shown, the filter cartridge 400 can comprise the fluid interconnect 100. The filter cartridge 400 typically comprises a cap portion, a housing portion, and a filtration media contained within the housing portion. The cap portion typically comprises structure for fluid ingress and fluid egress. In such filter cartridges, the fluid interconnect 100 would typically be located on the cap portion. Such fluid interconnect 100 may incorporate features discussed herein with regard to the fluid interconnect 100 as employed in filter capsules 300 or filtration systems 200. Incorporation of the fluid interconnect 100 in a filter cartridge 400 may provide at least the benefits of (i) an shorter overall assembly, that (ii) consumes less material in fabrication, and (iii) results in lower hold-up volume.

Figure 9:
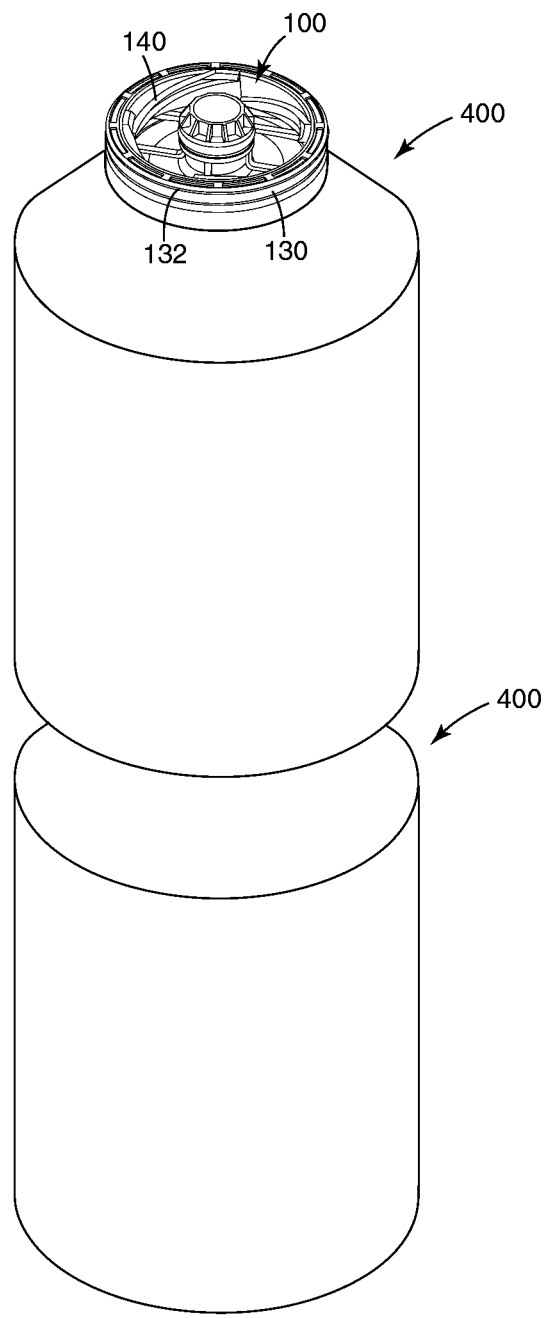
FIG. 9 is a perspective view of a stacked assembly of two filter cartridges each comprising a fluid interconnect.

As shown in FIG. 9, it is also envisioned that two or more filter cartridges 400 may be stacked in a modular assembly. In such embodiments, a single filter cartridge 400 may be provide with both a fluid interconnect 100 and a mating interconnect 350 on the opposing end. A plurality of such double-ended filter cartridges 400 may be stacked. In such embodiments, one filter cartridge 400 may be provided as the terminating piece, therefore comprising only the fluid interconnect with no opposing mating interconnect. At least one section of the stack could comprise a different type of filtration element, for example, depth filtration, scale reduction, antimicrobial treatment, antiviral treatment, flavor enhancement, or others. In such embodiments, it is envisioned that a user could custom-create a filter by stacking application-specific filter cartridges 400.

Figure 3:
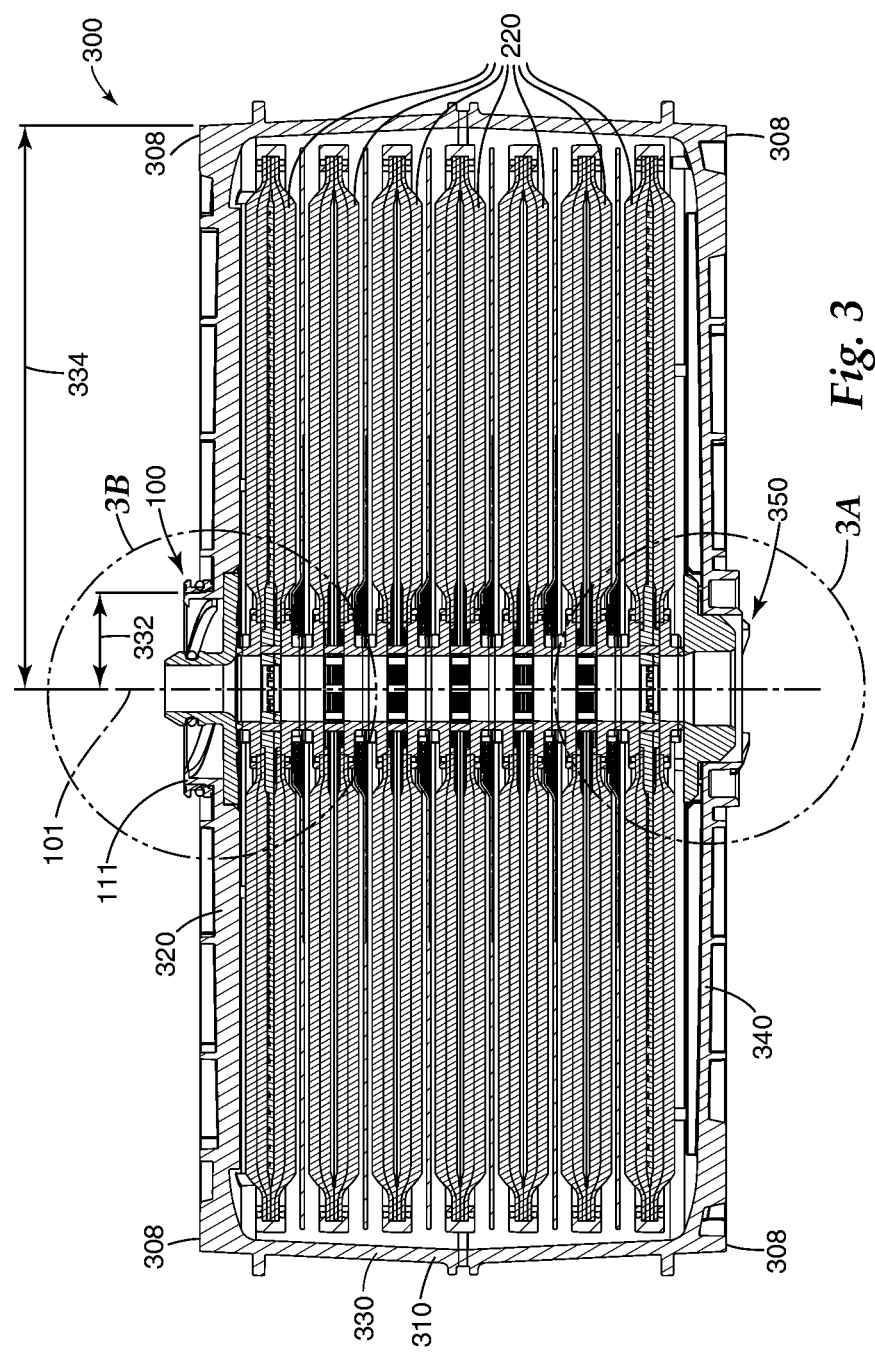
FIG. 3 is a cross-section view taken at 3-3 of FIG. 2 showing a filter capsule containing a plurality of filter elements therein.
Figure 3A:
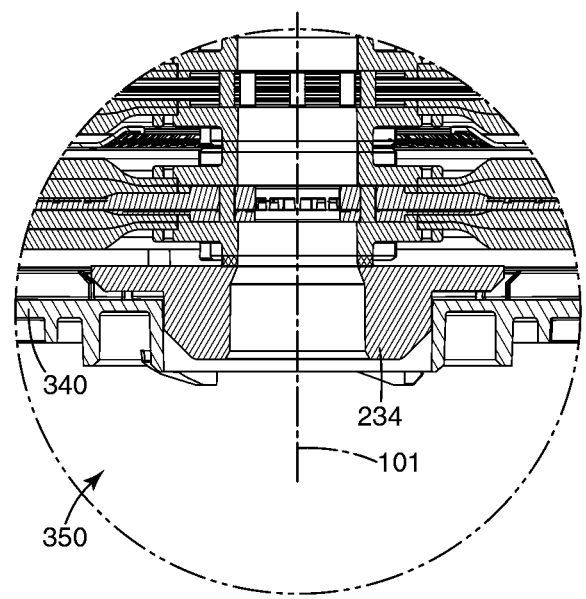
FIG. 3A is a detailed cross-section view taken at 3-3 of FIG. 2 showing a mating interconnect.

As shown in FIGS. 3 and 4, the filter capsule 300 may comprise a shell 310 having a first end wall 320, a first axis 101, and an outer capsule wall 330 spaced a first distance 334 from the first axis 101. The first end wall 320 may comprise a fluid interconnect 100. In some embodiments, the shell 310 comprises a second end wall 340 opposite the first end wall 320. In one embodiment, the second end wall 340 comprises a mating interconnect 350 that is connectable with the fluid interconnect 100. The shell 310 may be provided as two halves that are secured together. The two halves may be removably secured, such as by threading, or permanently secured. Where shell 310 is provided as two parts, it may have, for example, with a plastic construction, wherein two halves are hot-plate welded or spin-welded together to form the filter capsule 300. In one embodiment, parts of the shell 310 are constructed of polycarbonate. It is also envisioned that the shell 310 may be formed as a single part surrounding filtration elements 220, for example, by thermoforming.

In some embodiments, the filter capsule 300 is generally cylindrical. The fluid interconnect 100 may comprise a connector ring 111 spaced a second distance 332 from the first axis 101, a sealing member 130 disposed on the connector ring 111, and at least one camming member 140 disposed on the connector ring 111. In some embodiments, the first distance 334 may be at least four times larger than the second distance 332. In embodiments where the filter capsule 300 is cylindrical, the first distance 334 corresponds to a first radius and the second distance 332 corresponds to a second radius. In one embodiment, the outer capsule wall 330 comprises a cylinder having a diameter in a range from 12 inches to 20 inches, and the connector ring 111 comprises a cylinder having a diameter in a range from 1 inch to 6 inches. In a preferred embodiment, the outer capsule wall 330 comprises a cylinder having a diameter in a range from 15 inches to 18 inches, and the connector ring 111 comprises a cylinder having a diameter in a range from 2 inches to 4 inches. Other ratios of outer capsule wall 330 diameter to connector ring 111 diameter that may be desirable for a given application are envisioned and should be considered within the scope of the present disclosure.

Figure 3B:
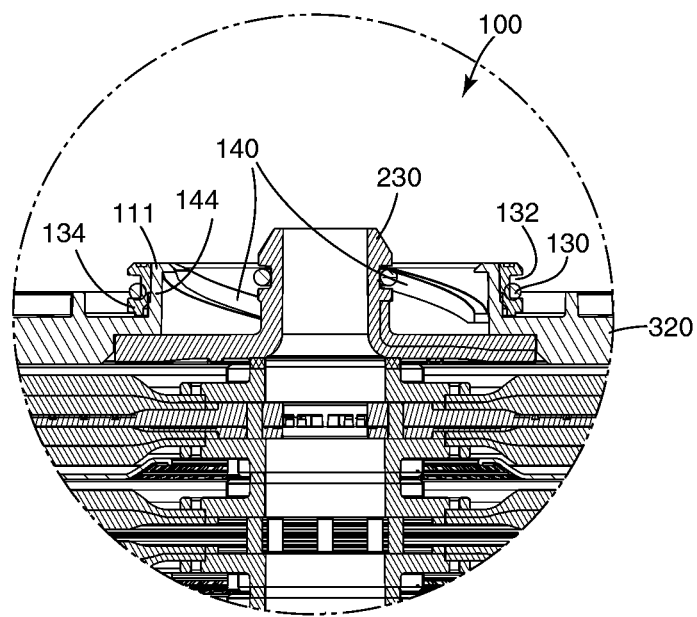
FIG. 3B is a detailed cross-section view taken at 3-3 of FIG. 2 showing a fluid interconnect.

In embodiments where the filter capsule 300 contains a plurality of disk-type filter elements 220, the capsule may be further provided with a male filtrate port 230 and a female filtrate port 234, as depicted in FIGS. 3, 3A, and 3B. Typically, the male filtrate port 230 is positioned inside the fluid interconnect 100 and provides, when sealed against the female filtrate port 234, fluid isolation of the filtrate for fluid communication between filter capsules 300. In such embodiments, the female filtrate port 234 may be provided (i) within, or (ii) as part of the mating interconnect 350. In one embodiment, the male filtrate port 230 is located in the mating interconnect 350, and the female filtrate port 234 is located in the fluid interconnect 100.

Various modifications and alterations of the invention will be apparent to those skilled in the art without departing from the spirit and scope of the invention. It should be understood that the invention is not limited to illustrative embodiments set forth herein.

What is claimed is:

1. A fluid interconnect for a fluid handling device comprising:
   a connector comprising a cylinder having a first axis, an inner connector wall comprising the inner diameter of the cylinder, and an outer connector wall disposed outboard of the inner connector wall, and facing radially outward and comprising the outer diameter of the cylinder;
   a sealing member disposed on the outer connector wall; and
   at least one camming member disposed on the inner connector wall;
   wherein the at least one camming member is disposed inboard of the sealing member; and
   wherein the sealing member and the at least one camming member are at least partially intersected by a common plane that is oriented normal to the first axis.

2. The fluid interconnect of claim 1 wherein the sealing member is disposed on a sealing ring member, wherein the at least one camming member is disposed on a camming ring member, and wherein the sealing ring member is secured to the camming ring member to form the connector.

3. The fluid interconnect of claim 1 comprising four camming members spaced about the inner connector wall.

4. The fluid interconnect of claim 1 wherein the sealing member comprises a non-lubricated o-ring.

5. The fluid interconnect of claim 1 wherein the fluid handling device comprises a filter capsule configured to contain at least one filter element.

6. The fluid interconnect of claim 1 wherein the fluid handling device comprises a filter cartridge.

7. The fluid interconnect of claim 1 wherein the sealing member is located on a vertical sealing surface.

8. A filter capsule comprising
   a shell having a first end wall, a first axis, and an outer capsule wall spaced a first distance from the first axis;
   wherein the first end wall comprises a fluid interconnect comprising:
      a connector ring comprising a cylinder spaced a second distance from the first axis, and comprising an inner connector wall comprising the inner diameter of the cylinder, and an outer connector wall disposed outboard of the inner connector wall, and facing radially outward and comprising the outer diameter of the cylinder;
      a sealing member disposed on the outer connector wall; and
      at least one camming member disposed on the inner connector wall;
   wherein the first distance is at least four times larger than the second distance; and
   wherein the sealing member and the at least one camming member are at least partially intersected by a common plane that is oriented normal to the first axis.

9. The filter capsule of claim 8 wherein the sealing member is located on a vertical sealing surface.

10. The filter capsule of claim 8 wherein the sealing member is disposed on a sealing ring member, wherein the at least one camming member is disposed on a camming ring member, and wherein the sealing ring member is secured to the camming ring member to form the connector ring.

11. The filter capsule of claim 8 comprising at least three camming members spaced about the connector ring.

12. The filter capsule of claim 8 wherein the sealing member comprises a non-lubricated o-ring.

13. The filter capsule of claim 8 wherein the at least one camming member is disposed inboard of the sealing member.

14. The filter capsule of claim 13 wherein the connector ring further comprises
   an inner ring wall; and
   an outer ring wall disposed outboard of the inner ring wall and facing radially outward;
   wherein the sealing member is located on the outer ring wall and the at least one camming member is located on the inner ring wall.

15. The filter capsule of claim 8 wherein the shell further comprises a second end wall opposite the first end wall.

16. The filter capsule of claim 15 wherein the second end wall comprises a mating interconnect that is connectable with the fluid interconnect.

17. A filtration system comprising
   a first filter capsule comprising the fluid interconnect according to claim 5;
   a second filter capsule comprising the fluid interconnect according to claim 5;

at least one filter element disposed within each filter capsule;

wherein the fluid interconnect connects the first filter capsule to the second filter capsule.

18. The filtration system of claim 17 wherein each filter capsule comprises a first end wall and a second end wall opposite the first end wall, the first end wall comprising the fluid interconnect, the second end wall comprising a mating interconnect, wherein each fluid interconnect connects to the adjacent mating interconnect.

19. The filtration system of claim 17 wherein the first filter capsule includes a different type of filter element than the second filter capsule.

20. The filtration system of claim 17 further comprising a press, wherein the press holds the filter capsules together during operation of the filtration system.

21. The filtration system of claim 20 wherein each filter capsule comprises a first end wall, a second end wall, and an outer capsule wall;

wherein the fluid interconnect connects the first end wall of the first filter capsule to the second end wall of the second filter capsule, wherein the press bears in the axial direction against the outer capsule wall of each filter capsule to hold the filter capsules together.

22. The filtration system of claim 17 further comprising a manifold member, wherein the fluid interconnect connects the manifold member to a filter capsule.

23. The filtration system of claim 17 wherein the sealing member is located on a vertical sealing surface.

24. A filtration system comprising a first filter capsule according to claim 8;
a second filter capsule according to claim 8;
at least one filter element disposed within each filter capsule;

wherein the fluid interconnect connects the first filter capsule to the second filter capsule.

25. The filtration system of claim 24 wherein each filter capsule comprises a first end wall and a second end wall opposite the first end wall, the first end wall comprising the fluid interconnect, the second end wall comprising a mating interconnect, wherein each fluid interconnect connects to the adjacent mating interconnect.

26. The filtration system of claim 24 wherein the first filter capsule includes a different type of filter element than the second filter capsule.

27. The filtration system of claim 24 further comprising a press, wherein the press holds the filter capsules together during operation of the filtration system.

28. The filtration system of claim 27 wherein each filter capsule comprises a first end wall, a second end wall, and an outer capsule wall;

wherein the fluid interconnect connects the first end wall of the first filter capsule to the second end wall of the second filter capsule, wherein the press bears in the axial direction against the outer capsule wall of each filter capsule to hold the filter capsules together.

29. The filtration system of claim 24 further comprising a manifold member, wherein the fluid interconnect connects the manifold member to a filter capsule.

30. The filtration system of claim 24 wherein the sealing member is located on a vertical sealing surface.

* * * * *